(12) United States Patent
Wiedermann et al.

(10) Patent No.: US 8,240,725 B2
(45) Date of Patent: Aug. 14, 2012

(54) BUMPER SYSTEM FOR MOTOR VEHICLES

(75) Inventors: Holger Wiedermann, Munich (DE); Frank Seifert, Neuried (DE); Torsten Groning, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 284 days.

(21) Appl. No.: 12/798,064

(22) Filed: Mar. 29, 2010

(65) Prior Publication Data

US 2010/0244471 A1    Sep. 30, 2010

(30) Foreign Application Priority Data

Mar. 31, 2009  (DE) .......................... 10 2009 015 139

(51) Int. Cl.
*B60R 19/38* (2006.01)
(52) U.S. Cl. ....................................... 293/133; 293/102
(58) Field of Classification Search .................. 293/102, 293/132, 133
See application file for complete search history.

(56) References Cited

U.S. PATENT DOCUMENTS

| | | | | |
|---|---|---|---|---|
| 3,840,260 A * | 10/1974 | Wacker et al. | ................ | 293/132 |
| 3,865,415 A * | 2/1975 | Saxl et al. | ................ | 293/133 |
| 3,887,223 A * | 6/1975 | Bez | ................ | 293/133 |
| 5,697,657 A * | 12/1997 | Unrath, Sr. | ................ | 293/118 |
| 6,142,542 A * | 11/2000 | Sherno | ................ | 293/132 |
| 6,302,458 B1 * | 10/2001 | Wang et al. | ................ | 293/132 |
| 6,343,821 B2 * | 2/2002 | Breed | ................ | 293/119 |
| 6,709,035 B1 * | 3/2004 | Namuduri et al. | ................ | 293/118 |
| 7,192,067 B2 * | 3/2007 | Hansen | ................ | 293/133 |
| 7,240,932 B2 * | 7/2007 | Guinehut | ................ | 293/132 |
| 7,341,397 B2 * | 3/2008 | Murphy | ................ | 404/6 |
| 7,416,043 B2 * | 8/2008 | Pipkorn et al. | ................ | 180/274 |

FOREIGN PATENT DOCUMENTS

| | | |
|---|---|---|
| DE | 2412082 | 10/1974 |
| DE | 3232940 A1 | 3/1984 |
| DE | 4413641 C1 | 6/1995 |
| DE | 19806541 A1 | 9/1998 |
| DE | 19847385 C1 | 4/2000 |
| DE | 102007012962 A1 | 9/2008 |
| EP | 0987148 A1 | 9/1998 |
| FR | 2895955 | 1/2006 |
| JP | 04154457 A | 5/1992 |

OTHER PUBLICATIONS

German Patent Office, Office Action dated Mar. 31, 2009, 4 pages.

* cited by examiner

*Primary Examiner* — Lori Lyjak
(74) *Attorney, Agent, or Firm* — Price Heneveld LLP

(57) ABSTRACT

A bumper system for motor vehicles includes a cross member, and at least one crush box positioned between the cross member and the vehicle frame. Two coupling levers have opposite ends operably and pivotally connected with a crush box and cross member. The coupling levers are arranged in a mutually parallel relationship and oriented at an angle relative to vehicle travel, such that the cross member is supported by the crush box for displacement from a ready position toward the vehicle frame in both horizontal and vertical directions. An energy absorption element constructed from a foam material was positioned between a cross member and the crush box, and is clamped between the coupling levers to selectively resist inward movement of the cross member from the ready position upon impact to absorb impact energy.

12 Claims, 1 Drawing Sheet

BUMPER SYSTEM FOR MOTOR VEHICLES

CLAIM OF PRIORITY

Applicants hereby claim the priority benefits under the provisions of 35 U.S.C. §119, basing said claim of priority on German Patent Application Serial No. 10 2009 015 139.7, filed Mar. 31, 2009. In accordance with the provisions of 35 U.S.C. §119 and Rule 55(b), a certified copy of the above-listed German patent application will be filed before grant of a patent.

BACKGROUND OF THE INVENTION

The invention relates to a bumper system for a motor vehicle.

The primary purpose of bumper systems is to absorb the impact when a motor vehicle strikes an obstacle, and to protect the vehicle body from structural damage during a low-speed collision. Bumper systems also protect pedestrians when they come into contact with a motor vehicle.

Current bumper systems generally comprise a flexurally rigid cross-member that is arranged horizontally and perpendicular to the direction of travel, and is coupled to each of two longitudinal supports on the vehicle body via components known as crush boxes. In a low-speed head-on collision, the type of collision that is typical in city driving, the crush boxes absorb the impact energy with plastic deformation. Statutory provisions imposed on and negotiated agreements accepted by the automobile industry with regard to protecting pedestrians provide that bumper systems should also minimize the stress on the lower extremities of pedestrians if there is contact between a pedestrian and the front of the vehicle. To this end, impact tests with a leg impacter are among the various tests performed on bumper systems that must meet compliance within a number of limits or parameters.

With respect to pedestrian protection, in the most common bumper system, at least one energy absorption element is attached directly to the front of the cross-member.

DE 44 13 641 C1 describes a bumper system in which impact absorption elements made of energy-absorbing plastic foam or a plastic honeycomb structure are arranged on the front of the cross-member.

Resilient structures are also attached to the front of the cross-member, in addition to plastic foams, plastic honeycomb structures, and porous energy absorption elements. DE 32 32 940 C2 discloses an energy absorption element configured as an undulating leaf spring. Moreover, thin strips of sheet that are attached to the cross-member as open profiles are used for the energy absorption element.

DE 198 06 541 A1 describes a cross-member that is configured as a shell and on which plastic foam layers having different densities are provided. The shell configured in this manner is attached to a flexurally rigid cross-member, and when the plastic is compressed in an impact, it can press backward, thus at least partially absorbing the impact energy.

In addition to passive systems, bumper systems are known which react to an impact with actively controllable elements. Thus, DE 198 47 385 C1 describes a system in which the bumper can be actively moved between a rest position and a functional position. The movement is accomplished using spring elements or elements made of a shape memory material.

DE 10 2007 012 962 A1 describes an actively switchable lock between a crush box and a cross-member. If there is contact with a pedestrian, it permits a bumper, including the crush box, to be pushed into the cross-member with low resistance.

JP 04 154 457 A discloses a bumper system for a motor vehicle, which has a cross-member that is arranged essentially transverse to the longitudinal supports of the vehicle frame. It also has crush boxes that are incorporated between the cross-member and the longitudinal supports. The cross-member may also be moved out of a ready position towards the longitudinal supports. Specifically, it can be moved both horizontally and vertically relative to the crush boxes. When displaced in this manner, the cross-member is pressed obliquely downward, and the energy absorption element in the form of connecting bars between the cross-member and the crush boxes, is deformed. Moreover, an energy absorption element made of a foamed material is provided between the cross-member and the front cover.

SUMMARY OF THE INVENTION

Proceeding from the prior art, an object of the invention is to create a bumper system that has improved shock absorbing behavior, especially with respect to pedestrian protection.

This object can be attained in accordance with the present invention.

Advantageous refinements of this object can also be attained in accordance with the present invention.

In accordance with the present invention, at least one energy absorption element, made of a foamed material, is provided between the cross-member and the crush boxes. The energy absorption element is clamped between at least two coupling levers. The coupling levers run at an angle and parallel to one another, and are pivotably connected indirectly to the cross-member and at least one crush box, but preferably to two crush boxes. The indirect or operable connection between the coupling levers and the cross-member is provided for instance using web plates that are welded to the cross-member. They can then be pivotably connected to the coupling levers. The coupling levers are pivotably connected on the other side to the crush boxes. The energy absorption element is clamped between the two coupling levers. Due to the angled position of the coupling levers, when the cross-member is in the ready position the energy absorption element preferably has a parallelogram configuration relative to the crush boxes, which may assume the shape of a rhombus.

The cross-member may be displaced upward or downward and horizontally. However, upward displacement is preferable, because if there is contact with a pedestrian, the pedestrian is generally also lifted upward. The deflection breaks down or divides the impact energy and impact force in the energy absorption element into horizontal and vertical components. Moreover, energy absorption can be influenced by the size of the energy absorption element, and thus of the resultant surface force. The material selected for and the size of the energy absorption element, adapted to the crush box in question, are parameters for energy absorption.

It must fundamentally be assured that for a normal crash, the cross-member is positioned such that it can, without fail, transmit the force that is being applied to the crush boxes.

When there is contact between a pedestrian and the cross-member, the coupling levers are pivoted, so that the cross-member pivots about the points of articulation on the crush boxes. The energy absorption element is stressed horizontally and vertically. The efficiency of the energy absorption element can be selectively optimized as a function of its angular position to the incoming force.

Since it is better for the pedestrian for the cross-member to move upward than for it to move downward, the points of articulation for the coupling levers are preferably arranged higher on the cross-member than the points of articulation on the crush boxes.

The coupling levers are advantageously formed from U profiles.

At least one support bar can be provided to interface with the coupling levers, in order to permit a motor vehicle to be towed using a tow hitch that is generally attached to the cross-member. If a traction force is exerted on the cross-member when needed, the coupling levers cannot pivot downward because the support bar, which is preferably arranged beneath the coupling lever, prevents this motion. In this manner, damage to the energy absorption element positioned between the coupling levers is prevented.

In a normal head-on collision, it is possible to assure that the impact energy is transmitted onto the crush boxes in that the points of articulation for the coupling levers are embodied as predetermined breaking or shear points.

Another variant of the present invention is characterized by a cross-member that can be pivoted about a horizontal axis that runs beneath the crush boxes. The cross-member is supported on a crush box via at least one energy absorption element. One energy absorption element is preferably provided between each crush box and the cross-member. In this case, when in the ready position, the cross-member is at an angle in front of the crush boxes. Each energy absorption element is then incorporated between the cross-member and the adjacent end face of the associated crush box.

When there is contact between a pedestrian and the cross-member, the cross-member pivots upwardly and towards the crush boxes. This deflection breaks down or splits the impact energy and impact force into horizontal and vertical components through the energy absorption elements. Energy absorption can also be influenced by the size of the energy absorption element, and thus of the resultant surface force.

The pivot axis of the cross-member beneath the crush boxes is preferably connected to the cross-member via at least one lever.

In this context, it can be advantageous to allocate a pivot limit in the form of a support bar to the cross-member. This will prevent the lever from pivoting in the direction of travel during towing, when there is traction on the cross-member.

The features of claim 8 provide a third variant of the present invention. According to this third variant, the cross-member is supported via an angled guide on at least one energy absorption element accommodated in a crush box. Preferably one angled guide is arranged between the cross-member and each crush box. In this case, the angled guides cause the impact energy and impact force to break down or divide into horizontal and vertical components in the energy absorption elements.

In accordance with claim 9, each angled guide comprises at least one guide bar that is connected to the cross-member, and that runs upward at an angle. Each angled guide further comprises a seat that is embodied in a crush box, and is for the guide bar. The energy absorption element is arranged facing the guide bar in the seat.

Also referring to this embodiment, in accordance with claim 10 a retention device in the form of at least one support bar is provided to interface with the guide bar, so that during towing, the necessary traction force can be exerted via the cross-member without negatively impacting the function of the energy absorption element. The support bar is allocated to the guide bar in the area of the crush box.

For further enhancing pedestrian protection, according to the features of claim 11 it can also be advantageous for an energy absorption element to be arranged on the front of the cross-member, as well. This energy absorption element can be configured in a conventional or well known manner.

Although in accordance with the present invention, the cross-member can have any desired cross-section, one preferred construction according to claim 12 provides that the cross-member has a U-shaped cross-section.

These and other advantages of the invention will be further understood and appreciated by those skilled in the art by reference to the following written specification, claims and appended drawings.

The invention shall be described in greater detail in the following using exemplary embodiments depicted in the drawings.

DETAILED DESCRIPTION OF THE PREFERRED EMBODIMENTS

Figure 1:
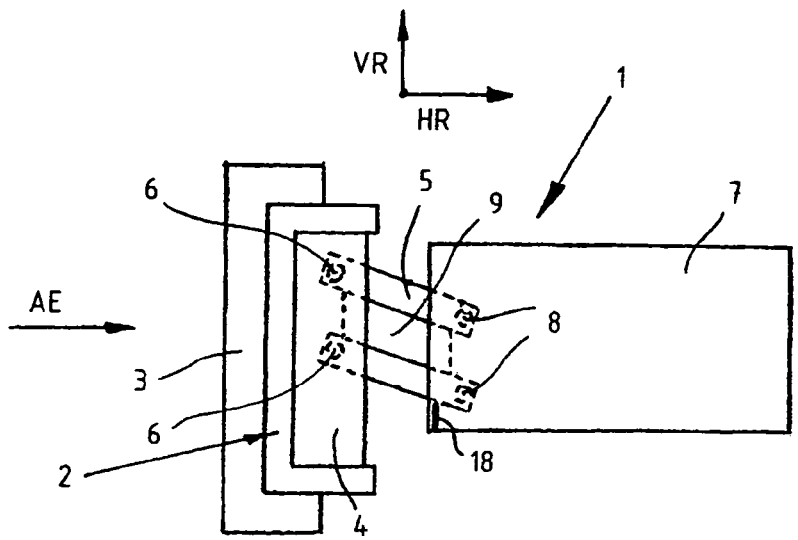
FIGS. 1-3 provide a schematic side-view cross-section of three bumper systems for a motor vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A bumper system for a motor vehicle is labeled 1 in FIG. 1. The bumper system 1 has a cross-member 2 with a U-shaped cross-section and is arranged essentially at a right angle to the longitudinal supports (not shown in greater detail) of a motor vehicle frame. An energy absorption element 3, made of foamed plastic, is positioned on the front of the cross-member 2.

Disposed within the interior of cross-member 2 are web plates 4 to which two coupling levers 5, having a U-shaped cross-section, are connected via pivot axes 6. The coupling levers 5 are arranged one above the other, at a predetermined interval, and are pivotally connected at the other sides or ends to crush boxes 7, that are in turn coupled to the longitudinal supports of the vehicle frame. The points of articulation 6 for the coupling levers 5 on the cross-member 2 are arranged higher than the points of articulation 8 on the crush boxes 7. A rhomboidal energy absorption element 9 made of foamed plastic is disposed between the coupling levers 5.

When there is impact contact, for instance between a pedestrian and the cross-member 2 at a slow vehicle speed, the cross-member 2 is displaced both horizontally, according to the arrow "HR," and vertically, according to the arrow "VR," because cross-member 2 is connected to the crush boxes 7 via the coupling levers 5. The impact energy "AE" is broken down or split in the energy absorption element 9 disposed between the coupling levers 5 into a horizontal component "HR" and vertical component "VR." Thus the magnitude of the risk of injury to the pedestrian is minimized.

The bumper system 1 is embodied such that after the energy absorption element 9 has fulfilled its function in a normal vehicle crash, all of the remaining acting forces "AE" are conducted or transmitted to the crush box 7. The crush box 7 then fulfills its protective (energy absorption) function to protect the vehicle body. For instance, this can be achieved by making the articulation points 6, 8 for the coupling levers 5 as predetermined shear or breaking points.

A support bar 18 is provided beneath the lower coupling lever 5 to make it possible for a vehicle to be towed via a tow hitch, that as a rule is attached to the cross-member 2. The lower coupling lever 5 can be positioned against the support bar 18 when there is a traction force on the cross-member 2. This prevents damage to the energy absorption element 9.

Figure 2:
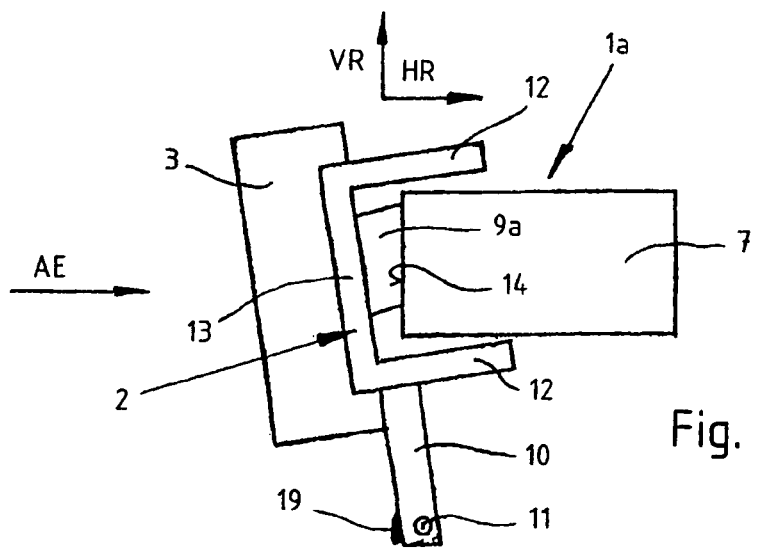

The embodiment of a bumper system 1a illustrated in FIG. 2 also provides a U-shaped cross-member 2 having an energy absorption element 3 positioned on the front thereof. This cross-member 2 is pivotably connected to a horizontal axis 11 via at least one downwardly oriented lever 10. In the illustrated ready position, the cross-member 2 is angled slightly forwardly. The legs 12 of the cross-member 2 overlap the crush boxes 7. An energy absorption element 9a made of foamed plastic is arranged between the bar 13 of the cross-member 2 and the end faces 14 of the crush boxes 7 facing the aforesaid bar 13.

When a pedestrian comes into contact with the cross-member 2, the cross-member 2 is pivoted about the horizontal axis 11. Because of this deflection, the impact energy "AE" is broken down or divided by the energy absorption element 9a into a horizontal component "HR" and a vertical component "VR."

In this FIG. 2 construction, a support bar 19 is preferably located adjacent to the lower segment of the lever 10. The lever 10 is positioned against this support bar 19 when a traction force is exerted on the cross-member 2 during towing.

The bumper system 1a is also embodied such that after the energy absorption element 9a has satisfied its function in a normal vehicle crash, all of the remaining acting force "AE" is conducted or transmitted to the crush boxes 7. The crush boxes then fulfill their protective energy absorption function to protect the vehicle body.

Figure 3:
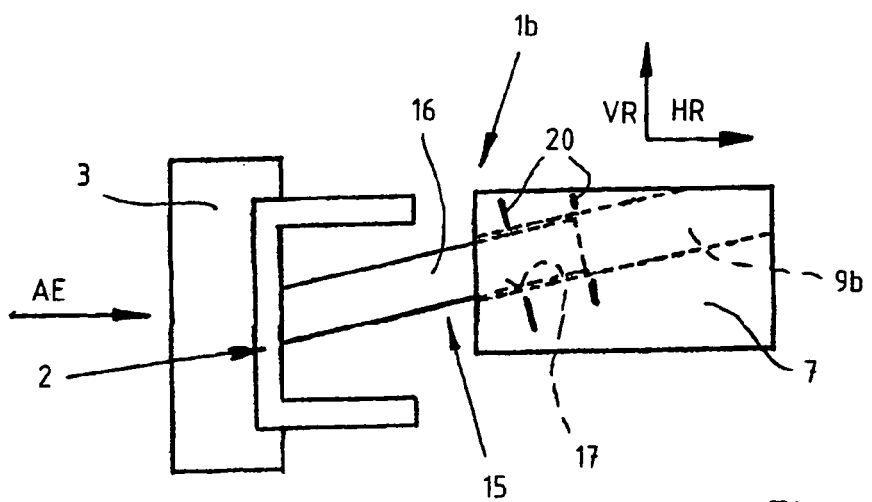

The embodiment shown in FIG. 3 depicts a bumper system 1b in which the cross-member 2 which has a U-shaped cross-section, and is using an angled guide 15, with at least one energy absorption element 9b that is made of foamed plastic and is received in a crush box 7. A front energy absorption element 3 is also positioned in front of the cross-member 2 in this embodiment as well.

The angled guide 15 comprises at least one guide bar 16 that is connected to the cross-member 2 and that runs upward at an angle, and one seat 17 for the guide bar 16, wherein the seat 17 is mounted or incorporated into a crush box 7. The energy absorption element 9b is arranged in the seat 17 facing the guide bar 16.

It can be seen that even with the embodiment of FIG. 3, when there is contact between a pedestrian and the cross-member 2, the deflection causes the impact energy "AE" to break up or divide in the energy absorption element 9b into a horizontal component "HR" and a vertical component "VR."

The bumper system 1b is also constructed such that after the energy absorption element 9b has satisfied its function in a normal vehicle crash, all of the remaining acting force "AE" is conducted to the crush boxes 7. The crush boxes 7 can then fulfill their protective function to protect the vehicle body.

In the FIG. 3 embodiment, as well, support bars 20 on the guide bar 16 prevent a traction force on the cross-member 2 from damaging the energy absorption element 9b.

In the foregoing description, it will be readily appreciated by those skilled in the art that modifications may be made to the invention without departing from the concepts disclosed herein. Such modifications are to be considered as included in the following claims, unless these claims by their language expressly state otherwise.

REFERENCES
1—Bumper system
  1a—Bumper system
  1b—Bumper system
2—Cross-member
3—Energy absorption element
4—Web plate
5—Coupling levers
6—Articulated points
7—Crush boxes
8—Articulated points
9—Energy absorption element
  9a—Energy absorption element
  9b—Energy absorption element
10—Lever
11—Pivot axis
12—Leg, see 2
13—Leg, see 2
14—End faces of 7
15—Oblique guide
16—Guide bar
17—Seat for 16
18—Support bar
19—Support bar
20—Support bars
  AE—Impact energy
  HR—Horizontal direction
  VR—Vertical direction

The invention claimed is:

1. A bumper system for motor vehicles of the type having a vehicle frame with longitudinal supports, comprising:
   a cross-member disposed generally transverse to the longitudinal supports of the vehicle frame;
   at least one crush box adapted to be supported by the vehicle frame, and disposed generally between said cross-member and the longitudinal supports of the vehicle frame for selectively supporting said cross-member;
   at least two coupling levers having first ends thereof operably pivotally connected with said crush box and second ends thereof operably pivotally connected with said cross-member; said coupling levers being arranged in a mutually parallel relationship and oriented at an angle relative to vehicle travel, whereby said cross-member is operably supported by said crush box for displacement from a ready position toward the longitudinal supports of the vehicle frame in both horizontal and vertical directions relative to said crush box; and
   an energy absorption element constructed from a foamed material, disposed generally between said cross-member and said crush box, and being clamped between said coupling levers to selectively resist inward movement of said cross-member from said ready position upon impact, and thereby absorb impact energy.

2. The bumper system as set forth in claim 1, wherein:
   said first ends of said coupling levers define first pivot points, and said second ends of said coupling levers define second pivot points; and said second pivot points are disposed vertically above said first pivot points in said ready position.

3. The bumper system as set forth in claim 1, wherein:
said coupling levers each have a generally U-shaped transverse cross-sectional configuration.

4. The bumper system as set forth in claim 1, including:
a support bar disposed adjacent a lower portion of at least one of said coupling levers to positively prevent said one of said coupling levers from shifting downwardly from said ready position.

5. The bumper system as set forth in claim 1, wherein:
said first ends of said coupling levers define first pivot points, and said second ends of said coupling levers define second pivot points; and wherein
at least one of said first and second pivot points comprises a selectively breakable pivot point.

6. A bumper system for motor vehicles of the type having a vehicle frame with longitudinal supports, comprising:
a cross-member disposed generally transverse to the longitudinal supports of the vehicle frame;
at least one crush box adapted to be supported by the vehicle frame, and disposed generally between said cross-member and the longitudinal supports of the vehicle frame; and wherein
said cross-member is operably pivotally supported for rotation about a generally horizontal axis that extends beneath said crush box for displacement from a ready position toward the longitudinal supports of the vehicle frame in both horizontal and vertical directions relative to said crush box; and including
an energy absorption element constructed from a foamed material, disposed generally between and operably connected with said cross-member and said crush box, and movably supporting said cross-member to selectively resist inward movement of said cross-member from said ready position upon impact, and thereby absorb impact energy.

7. The bumper system as set forth in claim 6, including:
a support bar which is positioned to limit pivoting of said cross-member in a downwardly direction from said ready position.

8. A bumper system for motor vehicles of the type having a vehicle frame with longitudinal supports, comprising:
a cross-member disposed generally transverse to the longitudinal supports of the vehicle frame;
at least one crush box adapted to be supported by the vehicle frame, and disposed generally between said cross-member and the longitudinal supports of the vehicle frame;
an angled guide having a first end thereof operably supported by said crush box and a second end thereof connected with said cross-member for displacement of said cross-member from a ready position toward the longitudinal supports of the vehicle frame in both horizontal and vertical directions relative to said crush box; and
an energy absorption element constructed from a foamed material, disposed in said crush box, and being operatively connected with said second end of said angled guide to selectively resist inward movement of said cross-member from said ready position upon impact, and thereby absorb impact energy.

9. The bumper system as set forth in claim 8, wherein:
said angled guide comprises at least one guide bar having a forward end thereof connected with said cross-member and disposed at a predetermined angle relative to the direction of vehicle travel, and including a seat incorporated into said crush box for receiving said guide bar; and
said energy absorption element is arranged facing said guide bar in said seat.

10. The bumper system as set forth in claim 9, including:
at least one support bar disposed in said crush box for retaining said guide bar.

11. The bumper system as set forth in claim 9, including:
an energy absorption member positioned on a front portion of said cross-member.

12. The bumper system as set forth in claim 9, wherein:
said cross-member has a generally U-shaped transverse cross-sectional configuration.

* * * * *